Patented Nov. 23, 1948

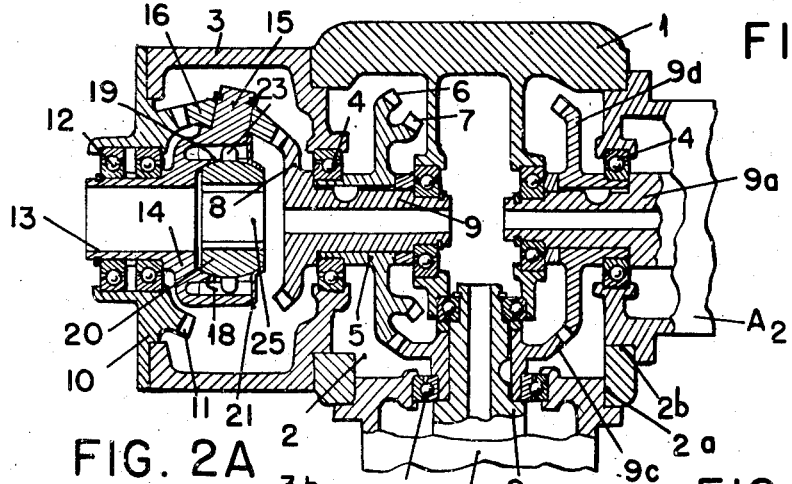
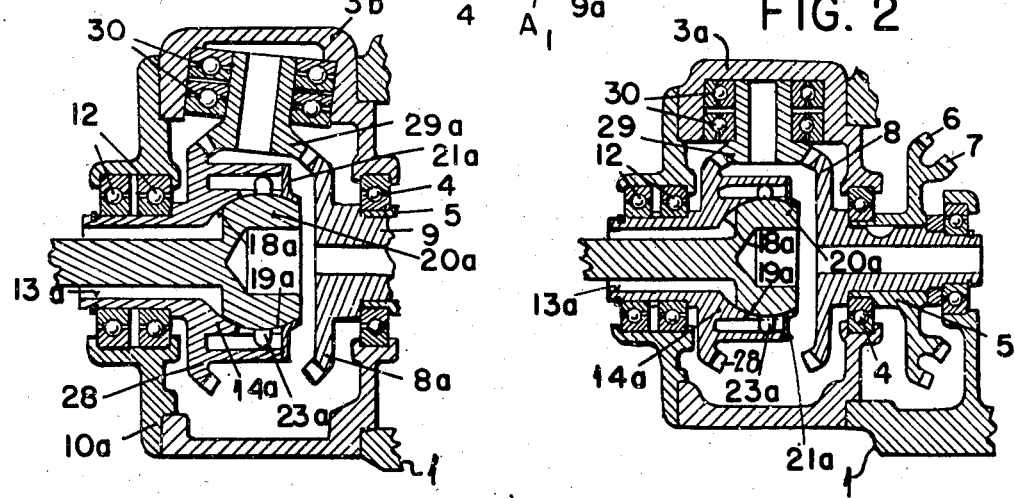
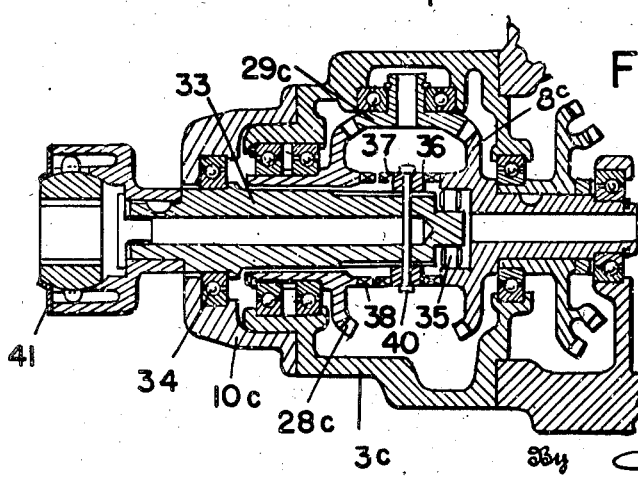

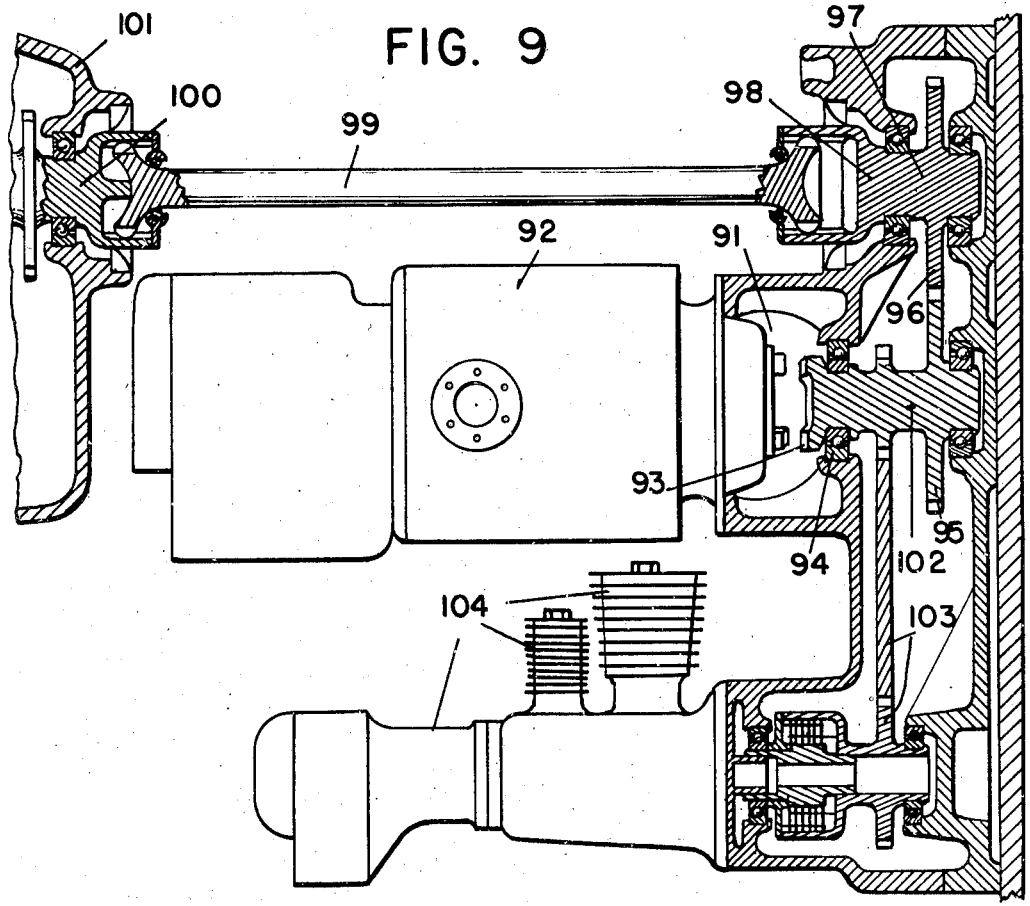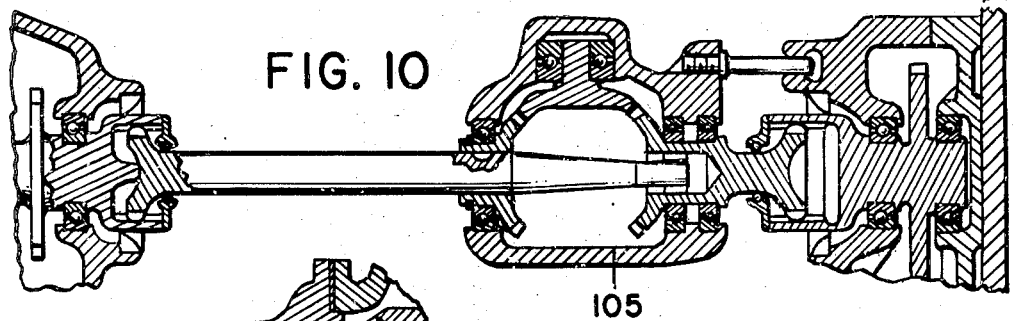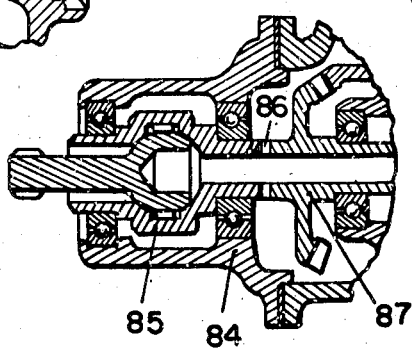

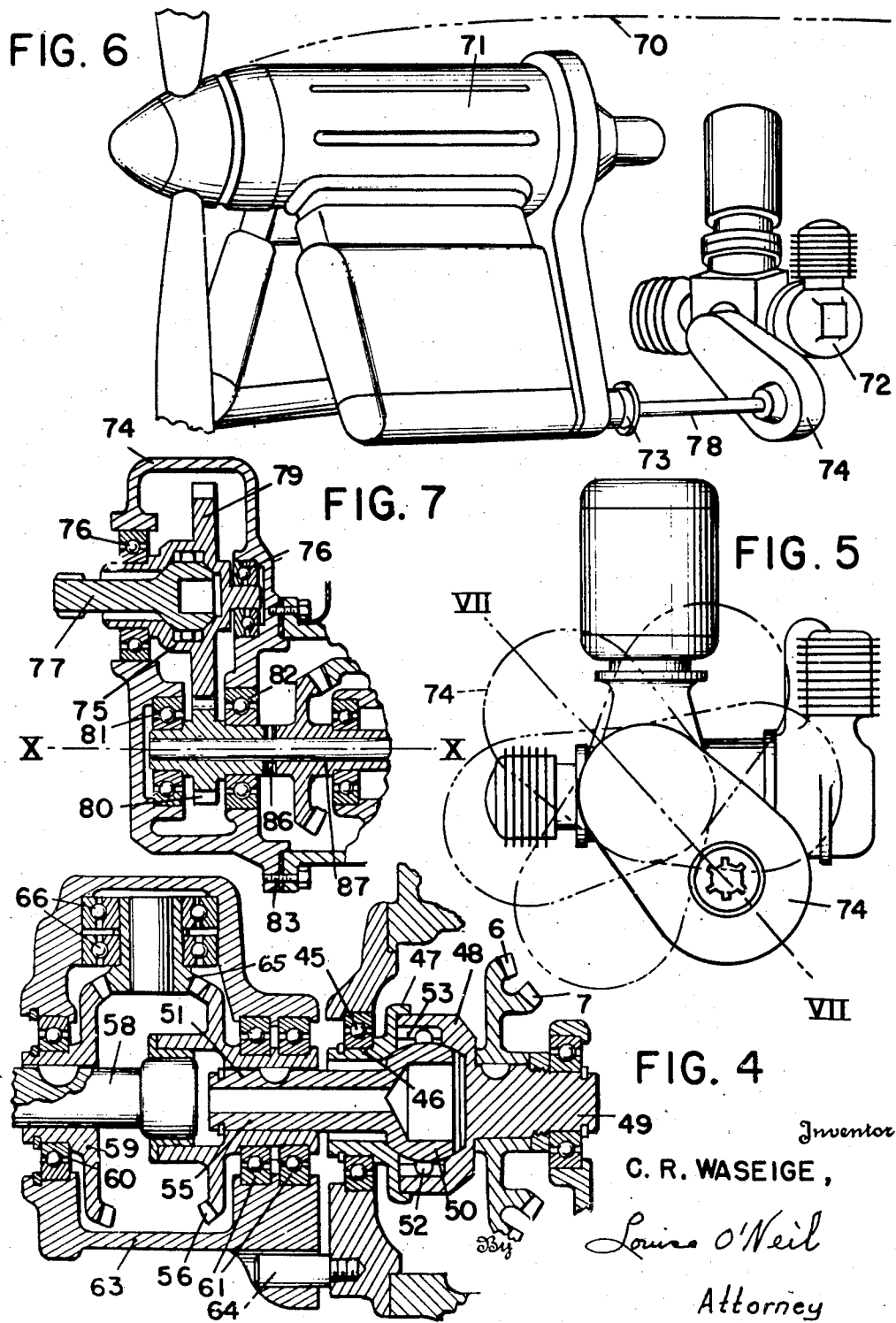

2,454,293

UNITED STATES PATENT OFFICE 2,454,293

MULTIDRIVE GEAR BOX FOR ACCESSORIES ON BOARD AIRCRAFT

Charles Raymond Waseige, Saint-Etienne (Loire), France; vested in the Attorney General of the United States Application May 27, 1942, Serial No. 444,734
In France April 8, 1941

7 Claims. (Cl. 74—389)

The present invention has for its object to improve the multi-drive gear boxes recently used for driving auxiliary devices or "accessories" on board aircraft.

With the gear boxes as hitherto used, it often happens that the engine power take-off, from which said boxes are driven, does not rotate at the speed at which the electric generator, which is mounted on the gear box casing and driven by means of a pair of conical toothed wheels, is to rotate.

On the other hand, a multi-engined aircraft is preferably provided with engines rotating in opposite directions. The manufacturer of accessories is thus compelled to build two types of electric generators, this resulting in complications for the users with regard to maintenance, spare parts, etc.

Besides, on engines having a very reduced transverse bulk not only is there no space for mounting the various accessories which are to supply the various needs on board, but it becomes difficult to lodge even a starter.

It may also happen that the available space does not permit of mounting the standard gear box for a given engine in alignment with the engine power take-off.

The invention aims at doing away with these various drawbacks and has for its subject-matter a plurality of features which may be used together or separately, depending upon the particular cases.

One of these features consists in that the gear box comprises a speed multiplying or reducing gear between the driving shaft and the electric generator, said multiplying speed gear consisting preferably of a planets-carrier driven by the driving shaft and whose planet pinions, which are conical and have their axis inclined to the vertical, roll on two sun wheels of different diameters, the largest of which is secured to the box casing and the other keyed on a shaft driving the electric generator, or the reverse.

In a convenient embodiment of the aforesaid arrangement, the planets-carrier is provided with a journal supported in bearings of the box casing and through which extends the driving shaft coming from the engine, the inside of said carrier being formed as a spherical bearing socket in which is mounted a hollow joint ball rotatively connected in a floating manner on the one hand with the planets-carrier by means of outer splines and, on the other hand, with the said shaft by means of inner splines.

Whatever may be the construction of the speed multiplying or reducing gear, the latter is preferably contained in a compartment of the casing.

Another feature consists in that the gear-box is provided with a reversing gear, which may be formed either as a removable unit adapted to be applied upon the box casing, or as a permanent part of the gear box, being then provided with two couplings one or the other of which may be used.

In a convenient embodiment of a multiplying, reducing or reversing gear, which is more particularly advantageous in that the overall length may be reduced, the whole of the multiplying, reducing or reversing gear is carried by a floating casing centered between the engine and the box on the cardan driving shaft and held against rotation by a stop on the box casing.

Still a further feature consists in that the starter is secured on the box casing and that a gearing embodied in the gear box connects said starter with the driving shaft, the latter thus serving also for starting the engine.

When the gear box cannot be arranged in alignment with the power take-off of the engine, the measure adopted consists in that the shaft which is to be actuated by the shaft coming from the engine is an intermediate counter-shaft carried by an angularly adjustable casing carried so as to be capable of being turned around the shaft entering into the box casing for driving the transmission elements of said box and of being fixedly held in any one of a plurality of possible positions.

It is more particularly advantageous that the various aforesaid devices, i. e. the reversing, multiplying or reducing gear, the angularly adjustable gear box, etc., comprise casings all adapted to be mounted upon the same opening of the gear box.

Lastly, in some cases, namely on multi-engined aircraft, the gear box is associated with an own auxiliary engine by which it is driven to provide for various needs.

Particular embodiments of the above-mentioned features are illustrated as nonlimitative examples on the annexed drawings, in which:

Fig. 1 shows a speed multiplying gear for an accessories driving gear box;

Fig. 2, a removable reversing gear for an accessories driving gear box;

Fig. 2A, a removable reversing and multiplying gear for an accessories driving gear box;

Fig. 3, a reversing gear forming an integral part of an accessories driving gear box;

Fig. 4, a floating reversing gear;

Figs. 5 and 6 are respectively front and side views showing schematically a gear box provided with a displaceable countershaft;

Fig. 7 is a section on the line VII—VII of Fig. 5, at a larger scale;

Fig. 8 is a similar view to Fig. 7, but shows an ordinary casing interchangeable with an angularly adjustable casing;

Fig. 9 is a fragmentary elevational diagrammatic view showing an engine and an accessories driving gear box carrying the engine starter;

Fig. 10 is a similar view to Fig. 9 and shows the modification of the connection between the engine and the gear box when the latter is additionally provided with a floating reversing gear.

In the exemplary embodiment of Fig. 1, there is shown only the casing 1 of the gear box used for driving accessories, which gear box may be of any known type. Casing 1 is provided with openings 2, 2a and 2b of the same size and shape, said openings 2a and 2b being adapted to accommodate standard detachable accessory casings A1 and A2 respectively, each of which has a driven shaft 9a projecting therefrom. Fixedly secured on the projecting ends of shafts 9a and disposed inside casing 1 are intermeshing beveled gears 9c and 9d.

Into an opening 2 of casing 1 is adapted to be fitted another casing 3, in the bottom of which is lodged a roll bearing 4 fitted onto the hub 5 of a conical gear wheel provided with two sets of teeth 6, 7, and located inside the casing 1 said set of teeth 6 being drivingly connected to beveled gear 9c. On the other side of said bottom is arranged a conical gear wheel 8, the stem or tail 9 of which is keyed in the hub 5. The wall of the casing 3 remote from said bottom consists in a cover 10 carrying on its inner side a conical set of teeth 11 co-axial with the wheel 8. In said cover is centered co-axially with said wheel 11, by means of roll bearings 12, the hollow stem 13 of a member 14 provided outwardly with inclined journal means 15 carrying planet pinion means 16 between the teeth 8 and 11, which form sun rolling tracks. Inside the member 14, a spherical bearing surface 18 is machined and located in a cylindrical chamber the inner wall of which is provided with splines 19. On said bearing is resting a ball 20 held in place by a cover-plate 21 provided with a spherical bearing and secured onto the end of the planets-carrier 14. The ball 20 is provided on its outer surface with short splines 23 engaging with the grooves 19, and said ball is further provided co-axially with the planets-carrier with a splined through hole 25 into which engages the similarly splined end of the driving shaft coming from the engine.

It will be apparent that the assembly just described forms a self-contained and unitary epicyclic speed multiplying gear. Furthermore the smaller accessory units A1 and A2 may be replaced by other units since the openings 2 are standardized.

If the diameters of the wheels 8 and 11 be reversed, the ratio will be changed, which may be useful in some cases. If there is no need of a multiplying gear in the relay, the assembly may be removed as a whole and replaced by another assembly comprising only a gear wheel, such as the double gear wheel 6, 7, integral with the ball and socket joint for the connection with the shaft coming from the engine.

The embodiment of Fig. 2 shows how one may reverse the rotation only, without at the same time changing the speed ratio; this embodiment, which constitutes only a removable reversing gear, differs from that of Fig. 1 only in that, instead of carrying planet pinions, the member 14a carries a set of conical teeth 28, of the same diameter as the wheel 8, and which meshes with the stationary intermediate pinion means 29, also in mesh with said wheel 8, the pinion means 29 being supported in roll bearings 30, secured to the casing 3a and disposed axially at right angles to the common axis of the wheels 8 and 28.

In this case also the speed may be multiplied or reduced according as the axis of the pinions 29a is inclined on one or the other side in the manner shown in Fig. 2A.

The embodiment of Fig. 3 is similar with that of Fig. 2 by the use of stationary intermediate pinions 29c, gearing with the wheels 8c and 28c, but it differs in that through the inside of the stem or tail of the wheel 28c extends an intermediate shaft 33 protruding at one end from the cover 10c of the casing 3c, in which cover it is supported by means of a roll bearing 34, its opposite end being centered in a socket 35 provided on the wheel 8c. On that part of said shaft 33 located between the wheels 8c and 28c is slidably splined a clutch collar 36 having two opposite annular sets of clutching claws 37 adapted to coact with similar sets of claws 38 provided respectively on the wheels 8c and 28c; a pin 40 holds the collar 36 in the one or the other of its two clutching positions. It is obvious that for a given direction of rotation of the shaft 33, the gear 6, 7 will rotate either in the one or the other direction, in accordance with said clutching position; the protruding part of the shaft 33 carries the ball and socket joint 41 for connection with the shaft coming from the engine, which joint is similar to those previously described and is only keyed onto said protruding part.

In the embodiment of Fig. 4, the opening 2 of the casing 1 is capped by a cover 44 the bottom of which presents a hole in which is fitted a roll bearing 45 supporting the stem 46 of a cup 47 having a spherical seat and on which is screwed another cup 48, provided internally with another spherical seat. The cup 48 is outwardly provided with a stem 49 co-axial with the cup 47 and on which is secured the double gear wheel 6, 7 driving the box gears. Between the cups 47, 48 is arranged a ball 50 which carries a shaft 51 projecting outwardly from the cover 44 through the stem 46. The ball 50 is provided outwardly with short splines 52 in engagement with splines 53 cut inside the cup 48. On the protruding part of the shaft 51 is keyed the stem 55 of a conical gear wheel 56 which is further provided with a central cylindrical cup 57 for centering the end of the shaft 58 coming from the engine. On a bearing surface of said shaft 58 is keyed a conical gear wheel 59 on the stem of which is fitted a roll bearing 60; other roll bearings 61 are fitted on the stem 55. These roll bearings 60 and 61 are fitted outwardly in recesses of an outer casing 63, which is solely supported thereby, and the rotation of which is prevented by a pin 64 fastened to the casing 44 and entering loosely into a perforated lug of said casing 63. In roll bearings 66 fixedly carried in the latter are mounted one or several intermediate pinions 65 gearing with the wheels 56 and 59.

The assembly thus constituted, supported solely by the co-axial Cardan shafts 51 and 58, is a floating assembly. This arrangement permits to mount a reversing gear without increasing the overall length or, for a given length, without reducing the distance between the cardans.

By including the axis of the intermediate pinion 63, as previously described with respect to Fig. 1, a multiplying or reducing gear of the floating type may likewise be obtained. Instead of a conical wheel transmission, the assembly may comprise a spur wheel transmission having a counter shaft parallel with the driving shaft. This would constitute a multiplying or reducing gear assembly without reversing, since the direction of rotation of the gear box would be the same with or without said assembly.

In Fig. 6, it will be seen that the available space in the cowling 70 containing the engine 71 does not permit of mounting a standard gear box 72 so that its driving shaft will be in alignment with the power take-off 73 of the engine. The standard drive head may then be substituted with a casing 74 inside which is mounted a countershaft 75 (Fig. 7) supported in roll bearings 76 fitted in said casing and carrying the ball coupling member 77 with the driving shaft 78, the other end of which is connected to the power take-off 73 of the engine; a gear wheel 79 keyed on the counter shaft 75 gears with a pinion 80 secured to a shaft 81 located co-axially with the axis X—X of the gear box and carried in roll bearings 82, fitted in the casing 74, said shaft 81 extending into the casing of the gear box 72, where it carries the gears for driving the various members of said gear box. The casing 74 may be turned around the axis X—X and locking means, such as studs 83 or the like, are provided for holding it stationary in any one of its angular positions, some of which are shown in Fig. 5.

It will be observed that in all said embodiments shown in Figs. 1 to 7, the casing 1 of the gear box and its opening 2 have received no modification whatever and that any one of these embodiments may thus be mounted upon said opening, according to the problems in view.

In Fig. 8, instead of an angularly adjustable casing 74 is shown a casing 84, which is interchangeable therewith and contains a hollow shaft 85 and its ball coupling member, arranged to be co-axial with the axis X—X of the gear box. In order to facilitate this substitution, a coupling 86, of any suitable type, is provided between the shaft 87, which is a permanent part of the gear box, and the shaft 81 of the angularly adjustable casing, as well as the shaft 85 of this direct drive casing 84. A similar coupling may obviously also be used on the speed gears, reversing gears, etc.

In the embodiment shown in Figs. 9 and 10, the casing 90 of the gear box, which as shown is a very flat casing consisting of a base and a cover, although a casing of any other suitable type may be used, presents an opening 91 receiving the nose of a starter 92 arranged opposite a clutching claw 93 supported in roll bearings 94 carried in the casing. A toothed wheel 95 keyed on said claw 93 gears with a toothed wheel 96 keyed on the tail 97 of a member 98 protruding out from the casing, and which is the member adapted to be coupled by a ball and socket joint with the shaft 99 leading to the power take-off 100 of the engine 101. The starting of the engine is thus effected from the starter through the medium of the wheels 95 and 96 and the shaft 99. A toothed wheel 102 keyed on the claw 93 drives gear trains 103 leading to the various accessories to be driven, such as 104, for example.

Fig. 10 shows how the preceding arrangement is modified by the addition of a floating reversing gear 105 of the type shown in Fig. 4.

Obviously, the invention is in nowise limited to the details of construction shown or described, which have only been given as examples.

What I claim is:

1. A self-contained gear-box for carrying and driving accessories on board aircraft, including a casing, a plurality of gears supported by and enclosed within said casing and operatively connected together to be rotated at the same time, a plurality of accessory elements carried by said casing and respectively connected to some of said gears to be driven thereby, a further accessory element operatively connected to another of said gears, an external driving element, and detachable means including gear means having a ratio differing from one between said latter accessory element and said external driving element.

2. In combination, a self-contained gear box for carrying and driving accessories on board aircraft, including a casing provided with a plurality of apertures and externally arranged to carry various accessories in register with said apertures, a plurality of gears supported by and enclosed within said casing and operatively connected together to be rotated at the same time, a plurality of accessory elements each in register with an aperture and operatively connected to some of said gears respectively to be driven thereby and providing a driving connection through the associated aperture, a further accessory element operatively connected to another of said gears, an external driving connection, and an operative detachable element forming a speed multiplying transmission between said latter accessory element and said driving connection.

3. A self-contained gear-box as in claim 1 wherein the operative connection which has a gear ratio differing from one includes a rotatable planet pinion carrier provided with a conical planet pinion having its axis inclined to a perpendicular to the axis of rotation of the planet carrier, a rotatable conical sun gear wheel in mesh with said pinion and a stationary conical orbit gear in mesh with said planet pinion.

4. The combination of: a self-contained gear-box for carrying and driving accessories on board aircraft and including a casing provided with a plurality of externally arranged apertures, a plurality of accessory casings respectively in register with some of said apertures, a plurality of gears supported by and enclosed within said first casing and operatively connected to be rotated at the same time, an accessory element carried by each of said accessory casings, each of the accessory elements being in register with one of said apertures and operatively connected to one of said gears to be driven thereby and providing a driving connection through the associated aperture, a self-contained unit including a third casing adapted to be secured to said first casing in register with another of said apertures, a gear train carried by said third casing and operatively connected to one of the gears of said first casing, and an accessory element carried by said third casing and operatively connected to said gear train to drive the latter.

5. The combination as in claim 4 in which said gear train has a gear ratio differing from one.

6. A self-contained gear-box as in claim 1 wherein the operative connection which has a gear ratio differing from one includes a rotatable planet pinion carrier provided with a conical planet pinion having its axis inclined to a perpendicular to the axis of rotation of the planet carrier, a conical sun gear wheel in mesh with said pinion, a stationary conical orbit gear in mesh with said planet pinion, said planet carrier including a trunnion provided with an axial bore and by means of which it is journaled in the casing, and a central spherical recess into which opens said axial bore, and wherein said further accessory means includes a splined ball fitted in said recess and in engagement with corresponding splines of the planet carrier.

7. The combination of a self-contained gear box for carrying and driving accessories on board aircraft including a casing, a plurality of gears supported by and enclosed within said casing and operatively connected together to be rotated at the same time, a plurality of accessory elements respectively connected to some of said gears to be driven thereby and a further accessory means including a planetary gear operatively connected to another of said gears and drivable from the exterior of the casing, said casing including a detachable portion carrying said further accessory means and removable as a whole therewith.

CHARLES RAYMOND WASEIGE.

REFERENCES CITED

The following references are of record in the file of this patent:

UNITED STATES PATENTS

| Number | Name | Date |
| --- | --- | --- |
| 1,661,550 | Vincent | Mar. 6, 1928 |
| 2,289,396 | Waseige | July 14, 1942 |

FOREIGN PATENTS

| Number | Country | Date |
| --- | --- | --- |
| 473,229 | Great Britain | Oct. 8, 1937 |